(12) United States Patent
David et al.

(10) Patent No.: US 8,584,633 B2
(45) Date of Patent: Nov. 19, 2013

(54) HARMONIC DRIVE CAMSHAFT PHASER WITH BIAS SPRING

(75) Inventors: Pascal David, Junglinster (LU); Sebastien Stoltz-Douchet, Lorraine (FR); Pierre Kimus, Attert (BE); Michael J. Fox, Stafford, NY (US)

(73) Assignee: Delphi Technologies, Inc., Troy, MI (US)

( * ) Notice: Subject to any disclaimer, the term of this patent is extended or adjusted under 35 U.S.C. 154(b) by 1089 days.

(21) Appl. No.: 12/536,575

(22) Filed: Aug. 6, 2009

(65) Prior Publication Data

US 2011/0030631 A1  Feb. 10, 2011

(51) Int. Cl.
*F01L 1/34* (2006.01)

(52) U.S. Cl.
USPC ........................................... 123/90.17

(58) Field of Classification Search
USPC .................... 123/90.15, 90.17; 464/160, 161
See application file for complete search history.

(56) References Cited

U.S. PATENT DOCUMENTS

| | | | | |
|---|---|---|---|---|
| 5,163,872 A * | 11/1992 | Niemiec et al. | | 464/2 |
| 6,276,321 B1 * | 8/2001 | Lichti et al. | | 123/90.17 |
| 7,421,990 B2 * | 9/2008 | Taye et al. | | 123/90.17 |
| 7,669,567 B2 * | 3/2010 | Sudou | | 123/90.17 |
| 2007/0277757 A1 * | 12/2007 | Fischer et al. | | 123/90.17 |
| 2008/0047511 A1 * | 2/2008 | Taye et al. | | 123/90.17 |

* cited by examiner

*Primary Examiner* — Thomas E. Denion
*Assistant Examiner* — Daniel Bernstein
(74) *Attorney, Agent, or Firm* — Thomas N. Twomey

(57) ABSTRACT

An eVCP camshaft phaser comprising a harmonic gear drive unit having a circular spline and a dynamic spline linked by a common flexspline, and a single wave generator disposed within the flexspline. The circular spline is connectable to either of a crankshaft-connectable sprocket or an engine camshaft, the dynamic spline being connectable to the other thereof. The wave generator is driven selectively by an eMotor to cause the dynamic spline to rotate past the circular spline, thereby changing the phase relationship between the crankshaft and the camshaft. A coaxial coil spring is connected to the sprocket and to the phaser hub and is positioned and tensioned to bias the phaser and camshaft to a stop position wherein the engine can run or be restarted after the eMotor is de-energized. Preferably, the spring comprises a spring cassette for easy assembly into the eVCP.

13 Claims, 5 Drawing Sheets

FIG. 7.

ELECTROMECHANICAL BRAKE + SPRING

| | ADVANCE (TIME IN s) | RETARD (TIME IN s) |
|---|---|---|
| BASELINE | 2.085 | INF |
| INVERTED | INF | 2.355 |

FIG. 8.

eMOTOR INERTIA + SPRING

| | ADVANCE (TIME IN s) | RETARD (TIME IN s) |
|---|---|---|
| BASELINE | 4.42 | 3.97 |
| INVERTED | 2.935 | 5.035 |

HARMONIC DRIVE CAMSHAFT PHASER WITH BIAS SPRING

TECHNICAL FIELD

The present invention relates to camshaft phasers for varying the timing of combustion valves in internal combustion engines by varying the phase relationship between an engine's crankshaft and camshaft; more particularly, to oil-less camshaft phasers wherein a harmonic gear drive unit is controlled by an electric motor (eMotor) to vary the phase relationship, also referred to herein as an "electric variable cam phaser" (eVCP); and most particularly, to an eVCP including a bias spring to return the eVCP to a predetermined default phase position. In one aspect of the invention, the bias spring may be provided in a housing, in cassette form.

BACKGROUND OF THE INVENTION

Camshaft phasers ("cam phasers") for varying the timing of combustion valves in an internal combustion engines are well known. A first element, known generally as a sprocket element, is driven by a chain, belt, or gearing from an engine's crankshaft. A second element, known generally as a camshaft plate, is mounted to the end of an engine's camshaft.

U.S. Pat. No. 7,421,990 B2, herein incorporated by reference, discloses an eVCP comprising first and second harmonic gear drive units facing each other along a 25 common axis of the camshaft and the phaser and connected by a common flexible spline (flexspline). The first, or input, harmonic drive unit is driven by an engine sprocket, and the second, or output, harmonic drive unit is connected to an engine camshaft.

A first drawback of this arrangement is that the overall phaser package is undesirably bulky in an axial direction and thus consumptive of precious space in an engine's allotted envelope in a vehicle.

A second drawback is that two complete wave generator units are required, resulting in complexity of design and cost of fabrication.

A third drawback is that the phaser has no means to move the driven unit and attached camshaft to a phase position with respect to the crankshaft that would allow the engine to start and/or run in case of drive motor power malfunction. eVCP have been put into production by two Japanese car manufacturers; interestingly, these devices have been limited to very low phase shift authority despite the trend in hydraulic variable cam phasers (hVCP) to have greater shift authority. Unlike hVCP, the prior art eVCP has no default seeking or locking mechanism. Thus, phase authority in production eVCPs to date has been undesirably limited to a low phase angle to avoid a stall or no-restart condition if the rotational position of the eVCP is far from an engine-operable position when it experiences eMotor or controller malfunction.

What is needed in the art is an eVCP including means for the eVCP to mechanically return to a default engine-operable position in the event of eMotor malfunction.

It is a principal object of the present invention to return an eVCP to a predetermined 'default' position in the event of eMotor malfunction.

SUMMARY OF THE INVENTION

Briefly described, an eVCP camshaft phaser comprises a flat harmonic drive unit having a circular spline and a dynamic spline linked by a common flexspline within the circular and dynamic splines, and a single wave generator disposed within the flexspline. The circular spline is connectable to either of an engine crankshaft sprocket or an engine camshaft, the dynamic spline being connectable to the other thereof. The wave generator is driven selectively by an eMotor to cause the dynamic spline to rotate past the circular spline, thereby changing the phase relationship between the crankshaft and the camshaft. The eMotor may be equipped with an electromagnetic brake. At least one coaxial coil spring is connected to the sprocket and to the phaser hub and is positioned and tensioned to bias the phaser and camshaft to a default position wherein the engine can run or be restarted should control of the eMotor be lost resulting in the eMotor being unintentionally de-energized or held in an unintended energized position. In one aspect of the invention, the spring is contained in a spring cassette for easy assembly into the eVCP.

BRIEF DESCRIPTION OF THE DRAWINGS

The present invention will now be described, by way of example, with reference to the accompanying drawings, in which:

FIG. 7 is a first table showing advance and retard times for exemplary baseline and inverted eVCPs when the harmonic drive unit is provided with a mechanical biasing spring in accordance with the present invention and the eMotor is provided with an electromagnetic brake; and FIG. 8 is a second table showing advance and retard times for exemplary baseline and inverted eVCPs when the harmonic drive unit is provided with a mechanical biasing spring in accordance with the present invention and the eMotor has no electromagnetic brake.

Figure 1:
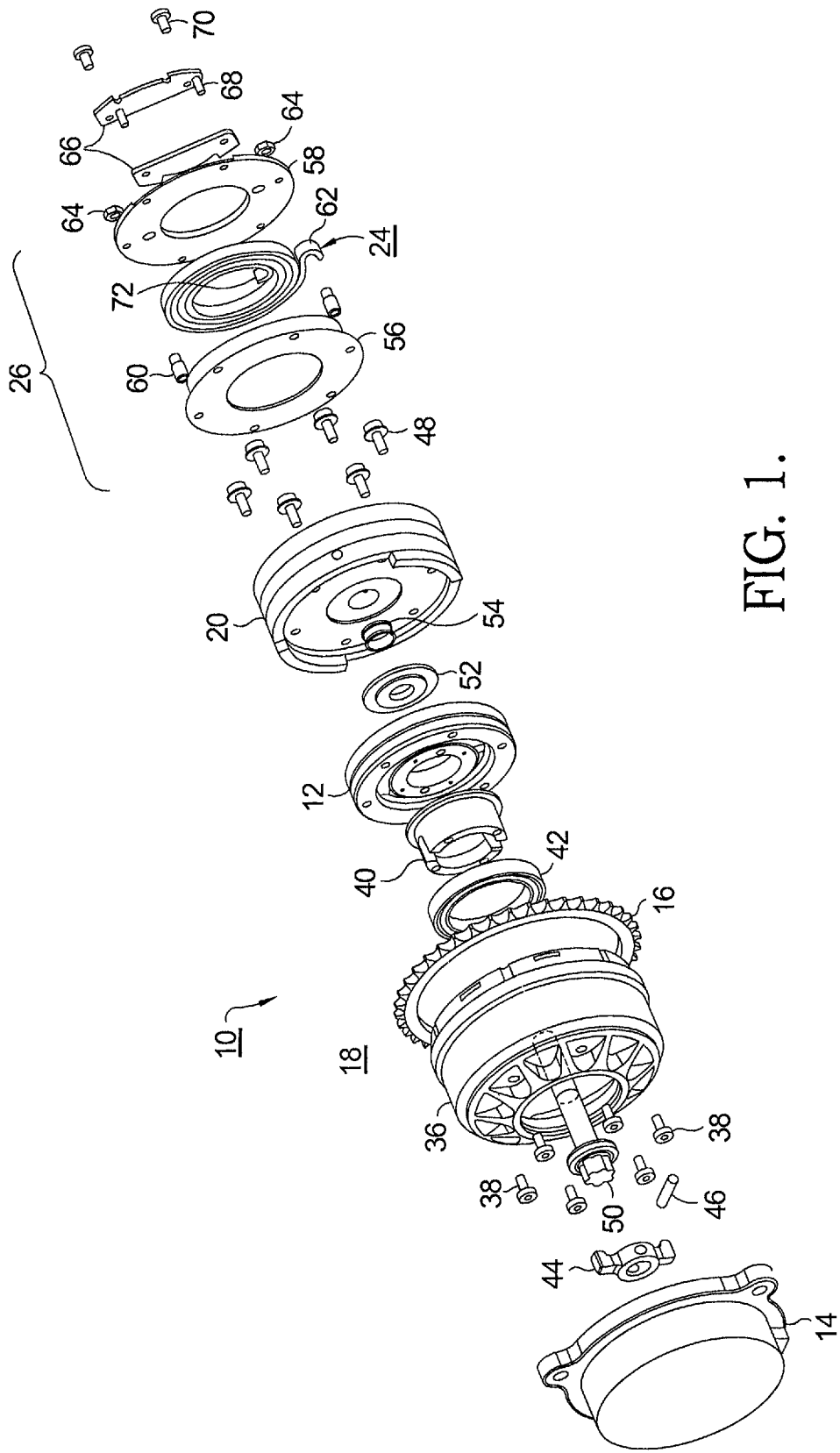
FIG. 1 is an exploded isometric view of a eVCP in accordance with the present invention.

The exemplifications set out herein illustrate currently preferred embodiments of the invention. Such exemplifications are not to be construed as limiting the scope of the invention in any manner.

DESCRIPTION OF THE PREFERRED EMBODIMENTS

Referring to FIGS. 1 through 4, an eVCP 10 in accordance with the present invention comprises a flat harmonic gear drive unit 12; a rotational actuator 14 that may be a hydraulic motor but is preferably a DC electric motor (eMotor), operationally connected to harmonic gear drive unit 12; an input sprocket 16 operationally connected to harmonic gear drive unit 12 and drivable by a crankshaft of engine 18; an output hub 20 attached to harmonic gear drive unit 12 and mountable to an end of an engine camshaft 22; and a bias spring 24 operationally disposed between output hub 20 and input sprocket 16. Spring 24 may be a component of a spring cassette 26. eMotor 14 may be an axial-flux DC motor.

Harmonic gear drive unit 12 comprises an outer first spline 28 which may be either a circular spline or a dynamic spline as described below; an outer second spline 30 which is the opposite (dynamic or circular) of first spline 28 and is coaxially positioned adjacent first spline 28; a flexspline 32 disposed radially inwards of both first and second splines 28,30 and having outwardly-extending gear teeth disposed for engaging inwardly-extending gear teeth on both first and second splines 28,30; and a wave generator 34 disposed radially inwards of and engaging flexspline 32.

Flexspline 32 is a non-rigid ring with external teeth on a slightly smaller pitch diameter than the circular spline. It is fitted over and elastically deflected by wave generator 34.

The circular spline is a rigid ring with internal teeth engaging the teeth of flexspline 32 across the major axis of wave generator 34.

The dynamic spline is a rigid ring having internal teeth of the same number as flexspline 32. It rotates together with flexspline 32 and serves as the output member. Either the dynamic spline or the circular spline may be identified by a chamfered corner 33 at its outside diameter to distinguish one spline from the other.

As is disclosed in the prior art, wave generator 34 is an assembly of an elliptical steel disc supporting an elliptical bearing, the combination defining a wave generator plug. A flexible bearing retainer surrounds the elliptical bearing and engages flexspline 32. Rotation of the wave generator plug causes a rotational wave to be generated in flexspline 32 (actually two waves 180° apart, corresponding to opposite ends of the major ellipse axis of the disc).

During assembly of a harmonic gear drive unit 12, flexspline teeth engage both circular spline teeth and dynamic spline teeth along and near the major elliptical axis of the wave generator. The dynamic spline has the same number of teeth as the flexspline, so rotation of the wave generator causes no net rotation per revolution therebetween. However, the circular spline has slightly fewer gear teeth than does the dynamic spline, and therefore the circular spline rotates past the dynamic spline during rotation of the wave generator plug, defining a gear ratio therebetween (for example, a gear ratio of 50:1 would mean that 1 rotation of the circular spline past the dynamic spline corresponds to 50 rotations of the wave generator). Harmonic gear drive unit 12 is thus a high-ratio gear transmission; that is, the angular phase relationship between first spline 28 and second spline 30 changes by 2% for every revolution of wave generator 34.

Of course, as will be obvious to those skilled in the art, the circular spline rather may have slightly more teeth than the dynamic spline has, in which case the rotational relationships described below are reversed.

Figure 2:
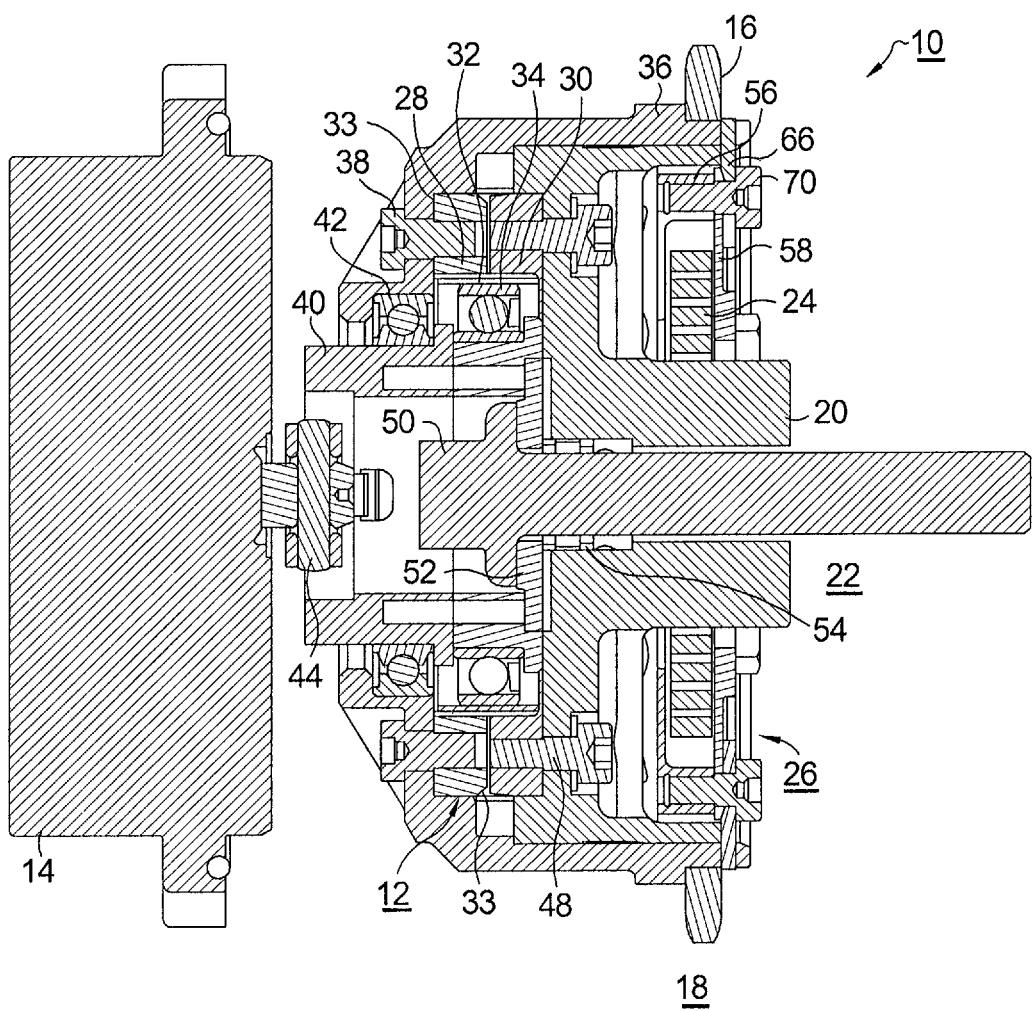
FIG. 2 is an elevational cross-sectional view of a the eVCP shown in FIG. 1.
Figure 3:
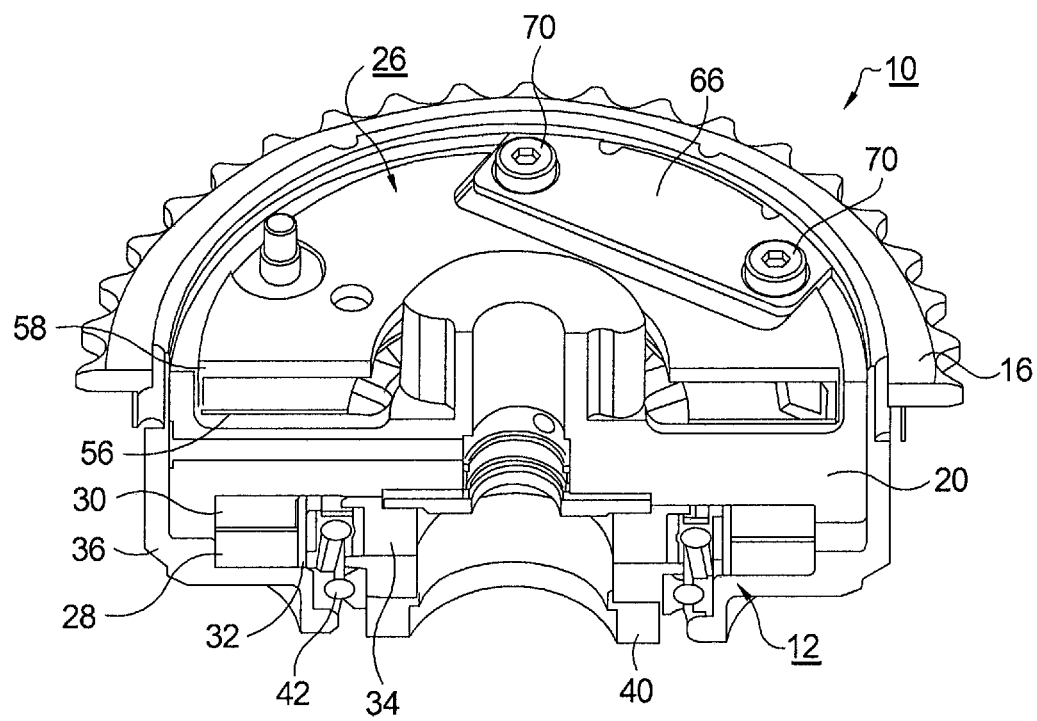
FIG. 3 is a perspective view in cross-section of the eVCP shown in FIGS. 1 and 2, with the eMotor, coupling, and bias spring omitted for clarity.
Figure 4:
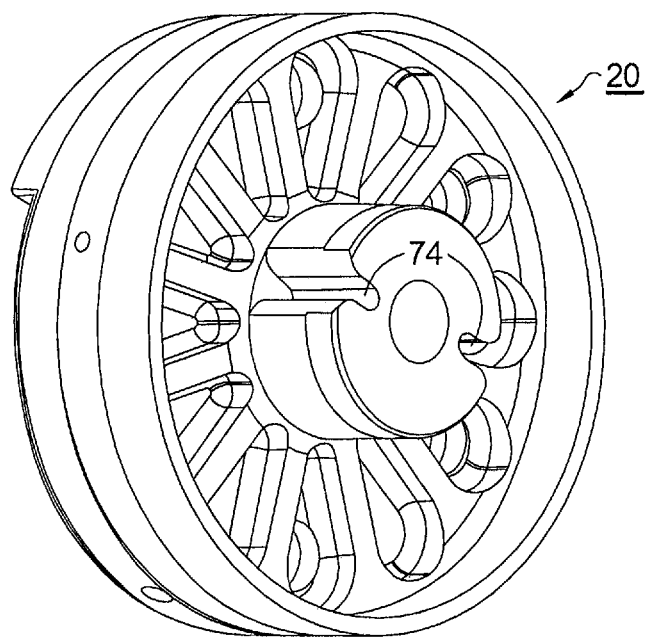
FIG. 4 is a perspective view of the eVCP hub showing detents for engaging the inner tang of the bias spring.

Still referring to FIG. 1 and 2, sprocket 16 is supported by a generally cup-shaped sprocket housing 36 that is fastened by bolts 38 to first spline 28. A coupling adaptor 40 is mounted to wave generator 34 and extends through sprocket housing 36, being supported by bearing 42 mounted in sprocket housing 36. A coupling 44 mounted to the motor shaft of eMotor 14 and pinned thereto by pin 46 engages coupling adaptor 40, permitting wave generator 34 to be rotationally driven by eMotor 14, as may be desired to alter the phase relationship between first spline 28 and second spline 30.

Hub 20 is fastened to second spline 30 by bolts 48 and may be secured to camshaft 22 by a central through-bolt 50 extending through an axial bore 51 in hub 20, and capturing a stepped thrust washer 52 and a filter 54 recessed in hub 20. In an eVCP, it is necessary to limit radial run-out between the input hub and output hub. In the prior art, this has been done by providing multiple roller bearings to maintain concentricity between the input and output hubs. Referring to FIG. 2, in one aspect of the invention, radial run-out is limited by a singular journal bearing interface 35 between housing 36 (input hub) and output hub 20, thereby reducing the overall axial length of eVCP 10 and its cost to manufacture over a prior art eVCP having multiple roller bearings.

Spring cassette 26 includes a bottom plate 56 and a top plate 58 disposed on opposite sides of spring 24. Shouldered spring spacers 60 extending between bottom and top plates 58 create an operating space for spring 24 and also provide an anchor for outer tang 62 on spring 24. Spring spacers 60 pass through top plate 58 and are secured by nuts 64. First and second retainer plates 66 may be used to secure cassette 26 to housing 36. For example, first and second retainer plates 66 may be positioned on top plate 58 by studs 68 and secured to bottom plate 56 by bolts 70. Retainer plates 66 may extend radially beyond the edges of top plate 58 to engage an annular groove or slots formed in sprocket housing 36, thereby axially positioning and locking cassette 26 in place on hub 20 such that the inner tang 72 of spring 24 engages one of two alternate detents 74 formed in hub 20. Retainer plates 66 exemplarily demonstrate only one arrangement for attaching cassette 26 to eVCP 10; obviously, all other alternative attaching arrangements are fully comprehended by the invention.

In the event of an eMotor malfunction, spring 24 is biased to back-drive harmonic gear drive unit 12 without help from eMotor 14 to a rotational position of second spline 30 wherein engine 18 will start or run, which position may be at one of the extreme ends of the range of authority or, in one aspect of the invention, intermediate of the phaser's extreme ends of its rotational range of authority. For example, the rotational range of travel in which spring 24 biases harmonic gear drive unit 12 may be limited to something short of the end stop position of the phaser's range of authority. Such an arrangement would be useful for engines requiring an intermediate park position for idle or restart.

Figure 6:
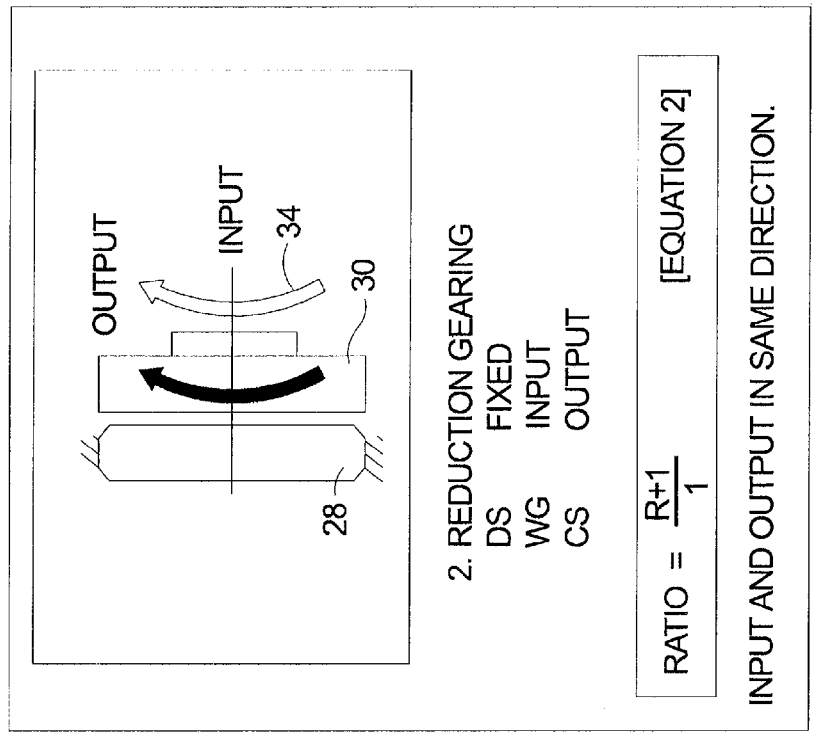
FIG. 6 is a schematic drawing showing a second gearing relationship in an eVCP, referred to herein as the inverted splines arrangement, wherein the circular spline drives the camshaft and the dynamic spline is driven by the sprocket.
Figure 5:
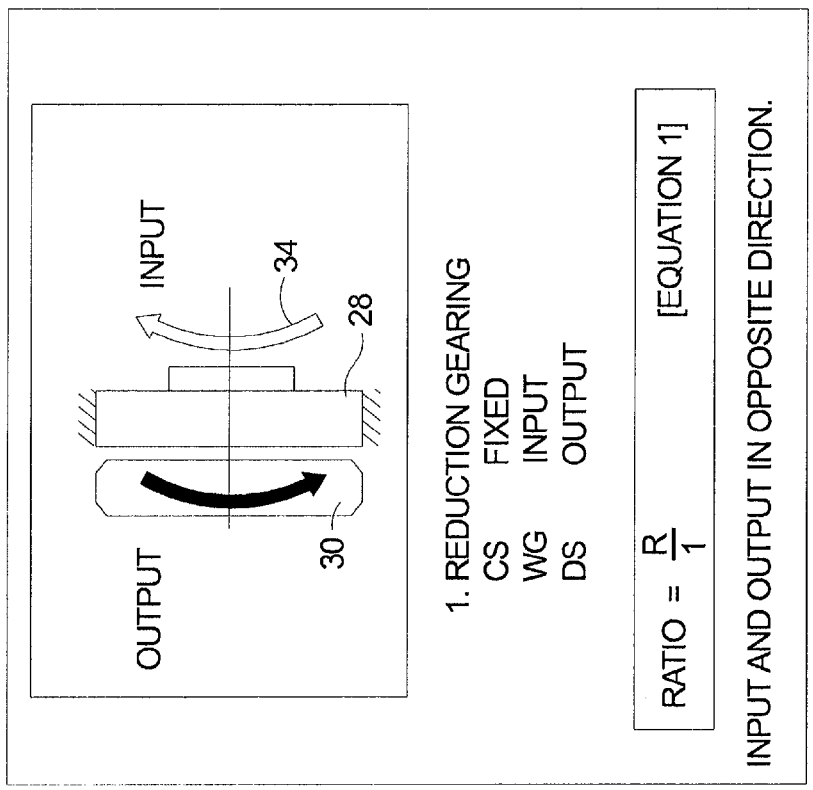
FIG. 5 is a schematic drawing showing a first gearing relationship in an eVCP, referred to herein as the baseline splines arrangement, wherein the dynamic spline drives the camshaft and the circular spline is driven by the sprocket.

Referring now to FIGS. 5 and 6, an advantage of a flat harmonic gear drive unit such as unit 12, as opposed to a cup-type unit such as is disclosed in the incorporated reference, is that unit 12 may be installed in either of two orientations within sprocket housing 36. In the baseline splines arrangement (FIG. 5), first or input spline 28 is the circular spline and is connected to sprocket housing 36, and second spline 30 is the dynamic spline and is connected to hub 20. In the inverted splines arrangement (FIG. 6), first spline 28 is the dynamic spline and is connected to sprocket housing 36, and second spline 30 is the circular spline and is connected to hub 20.

Fail-safe performance of the harmonic gear drive unit in eVCP 10 is not identical in the two orientations. Thus, a desired orientation may be selected during installation to minimize the response time for eVCP 10 to return to a preferred default position when eMotor 14 is de-energized when the engine is shut down or as a fail-safe response when eMotor experiences a failure (unintentionally energized or de-energized). In both orientations, the output gear, which is second spline 30 rotates with respect to first spline 28. When the circular spline is first spline 28 and the dynamic spline is the second spline 30, as shown in FIG. 5 (baseline arrangement), the dynamic spline rotates in a direction opposite from the input direction of the wave generator; however, when the dynamic spline is first spline 28 and the circular spline is the second spline 30, as shown in FIGS. 2 and 6 (inverted arrangement), the circular spline is the output gear and rotates in the same direction as the input direction of the wave generator.

Referring to FIG. 7, it is seen that if an exemplary eVCP is equipped with both a bias spring 24 and also a fail-safe electromagnetic brake (not shown but known in the art) on eMotor 14, the baseline spline arrangement shown in FIG. 5 is preferred because the failsafe advance time upon loss of power is minimized.

Referring to FIG. 8, it is seen that if an exemplary eVCP is equipped with a bias spring 24 but without a fail-safe electromagnetic brake on eMotor 14, the inverted spline arrangement shown in FIG. 6 is preferred because the fail-safe advance time upon loss of power is minimized.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A camshaft phaser for controllably varying the phase relationship between a crankshaft and a camshaft in an internal combustion engine, comprising:
    a harmonic gear drive unit including a circular spline and a dynamic spline, a flexspline disposed within said circular spline and said dynamic spline, a wave generator disposed within said flexspline, and a rotational actuator connected to said wave generator; and
    a sprocket connectable to the crankshaft of said internal combustion engine;
    a sprocket housing supportive of said sprocket and attached to said harmonic gear drive unit; and
    a hub attached to said harmonic gear drive unit and connectable to a camshaft of said internal combustion engine;
    wherein one of said circular spline and said dynamic spline is attached to said sprocket housing and the other of said circular spline and said dynamic spline is attached to said hub.

2. The camshaft phaser in accordance with claim 1 further comprising:
    at least one spring operationally connected to said circular spline and to said dynamic spline for urging one of said circular and dynamic splines to move the camshaft phaser to a default rotational position.

3. The camshaft phaser in accordance with claim 1 wherein said rotational actuator includes an electric motor.

4. The camshaft phaser in accordance with claim 3 wherein said electric motor is a DC axial-flux motor.

5. The camshaft phaser in accordance with claim 3 wherein said electric motor is equipped with an electromagnetic brake.

6. The camshaft phaser in accordance with claim 1 wherein said sprocket housing forms a journal bearing interface with said hub for limiting a radial run-out between said hub and said sprocket housing.

7. The camshaft phaser in accordance with claim 2 wherein said sprocket housing is operationally connected to a first tang of said spring.

8. The camshaft phaser in accordance with claim 7 wherein said hub is operationally connected to a second tang of said spring.

9. The camshaft phaser in accordance with claim 8 wherein said second tang is connected to said hub.

10. The camshaft phaser in accordance with claim 2 wherein said camshaft phaser includes a range of authority having a first end, a second end and a position intermediate said first and second ends of authority and wherein said default rotational position is at said first end.

11. The camshaft phaser in accordance with claim 2 wherein said camshaft phaser includes a range of authority having a first end, a second end and a position intermediate said first and second ends of authority and wherein said default rotational position is at said intermediate position.

12. A camshaft phaser for controllably varying the phase relationship between a crankshaft and a camshaft in an internal combustion engine, comprising:
    a) a harmonic gear drive unit including a circular spline and a dynamic spline, a flexspline disposed within said circular spline and said dynamic spline, a wave generator disposed within said flexspline, and a rotational actuator connected to said wave generator;
    b) at least one spring operationally connected to said circular spline and to said dynamic spline for urging one of said circular and dynamic splines to move the camshaft phaser to a default rotational position;
    c) a sprocket connectable to the crankshaft of an internal combustion engine;
    d) a sprocket housing supportive of said sprocket and attached to said harmonic gear drive unit and operationally connected to a first tang of said spring; and
    e) a hub attached to said harmonic gear drive unit and connectable to a camshaft of said internal combustion engine and operationally connected to a second tang of said spring;
    wherein said circular spline is attached to said sprocket housing and said dynamic spline is attached to said hub.

13. A camshaft phaser for controllably varying the phase relationship between a crankshaft and a camshaft in an internal combustion engine, comprising:
    a) a harmonic gear drive unit including a circular spline and a dynamic spline, a flexspline disposed within said circular spline and said dynamic spline, a wave generator disposed within said flexspline, and a rotational actuator connected to said wave generator;
    b) at least one spring operationally connected to said circular spline and to said dynamic spline for urging one of said circular and dynamic splines to move the camshaft phaser to a default rotational position;
    c) a sprocket connectable to the crankshaft of an internal combustion engine;
    d) a sprocket housing supportive of said sprocket and attached to said harmonic gear drive unit and operationally connected to a first tang of said spring; and
    e) a hub attached to said harmonic gear drive unit and connectable to a camshaft of said internal combustion engine and operationally connected to a second tang of said spring;
    wherein said dynamic spline is attached to said sprocket housing and said circular spline is attached to said hub.

* * * * *